United States Patent
Sugimoto et al.

(10) Patent No.: US 12,283,076 B2
(45) Date of Patent: Apr. 22, 2025

(54) DECODING METHOD, DECODING APPARATUS AND PROGRAM FOR DECODING PART OF AN ENTIRE POINT CLOUD IN A THREE-DIMENSIONAL SPACE

(71) Applicant: NIPPON TELEGRAPH AND TELEPHONE CORPORATION, Tokyo (JP)

(72) Inventors: Shiori Sugimoto, Musashino (JP); Mayuko Watanabe, Musashino (JP); Ryuichi Tanida, Musashino (JP); Hideaki Kimata, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 25 days.

(21) Appl. No.: 18/039,407

(22) PCT Filed: Dec. 25, 2020

(86) PCT No.: PCT/JP2020/048833
§ 371 (c)(1),
(2) Date: May 30, 2023

(87) PCT Pub. No.: WO2022/137537
PCT Pub. Date: Jun. 30, 2022

(65) Prior Publication Data
US 2023/0419558 A1  Dec. 28, 2023

(51) Int. Cl.
*H04N 19/96* (2014.01)
*G06T 9/40* (2006.01)

(52) U.S. Cl.
CPC ............... *G06T 9/40* (2013.01); *H04N 19/96* (2014.11)

(58) Field of Classification Search
CPC . G06T 9/40; G06T 9/001; G06T 2207/10028; H04N 19/96; H04N 19/167; H04N 19/174; H04N 19/597; H04N 19/70
(Continued)

(56) References Cited

U.S. PATENT DOCUMENTS

2022/0038674 A1   2/2022  Yasuda et al.
2023/0386088 A1 * 11/2023 Oh .................. H04N 19/96

FOREIGN PATENT DOCUMENTS

EP          4002277 A1   5/2022
WO   WO-2020071116 A1   4/2020

OTHER PUBLICATIONS

Hyun-Mook Oh et al., International Organisation for Standardisation Organisation Internationale De Normalisation ISO/IEC JTC 1/SC 29/WG 7 Coding of Moving Pictures and Audio, ISO/IEC JTC 1/SC 29/WG 7 m 55350, Online, Oct. 2020.
(Continued)

Primary Examiner — Susan E. Hodges

(57) ABSTRACT

A decoding method is a decoding method performed by a decoding device, the decoding method including steps of: acquiring, from among a plurality of slice numbers indicating a plurality of slices associated with encoded data of the entire point cloud distributed in a three-dimensional space, a first slice number indicating a first slice associated with encoded data of a point cloud of a first space that is a portion of the three-dimensional space, on the basis of a pointer indicating the first slice; and acquiring the encoded data of the point cloud of the first space on the basis of the first slice number, and decoding point cloud data of the first space from the encoded data of the point cloud of the first space.

7 Claims, 9 Drawing Sheets

(58) Field of Classification Search
USPC .................................................. 375/240, 40
See application file for complete search history.

(56) References Cited

OTHER PUBLICATIONS

Yiting Shao et al, "G-PCC TMC13 CE13.2 report on point cloud tile and slice based coding", ; 126. MPEG Meeting, No. m47227, XP030211122, Mar. 24, 2019.

Yiting Shao et al: "PCC TMC13 CE13.2 Report on point cloud tile and slice based coding", 123. MPEG Meeting; Jul. 16, 2018-Jul. 20, 2018; Ljubljana; (Motion Picture Expert Group or ISO/IEC JTC1/SC29/WG11), No. m4352815 Jul. 2018 (Jul. 15, 2018), XP030197356, Retrieved from the Internet: URL:http://phenix.int-evry.fr/mpeg/doc_end_user/documents/123_Ljubljana/wg11/m43528-v1-m43528_v1_CE13.2_tile_and_slice_based_coding.zip ; m43528_TMC13_CE13.2_Point_Cloud_Tile_and_Slice_Based_Coding.docx [retrieved on Jul. 15, 2018].

* cited by examiner

| geometry_data_unit_footer () { | Descriptor |
|---|---|
| ... | |
|    num_neighbour_slices_minus1 | u(8) |
|    for (i=0;i<=num_neighbour_slices_minus1;++) { | |
|       neigbour_slice_id[i] | |
|    } | |
| ... | ue(v) |
| } | |

FIG. 4

| SLICE NUMBER | X COORDINATE | Y COORDINATE | Z COORDINATE |
|---|---|---|---|
| #1 | $0 \leq x \leq 127$ | $0 \leq y \leq 127$ | $0 \leq z \leq 127$ |
| #2 | $0 \leq x \leq 127$ | $0 \leq y \leq 127$ | $0 \leq z \leq 127$ |
| #3 | $0 \leq x \leq 1$ | $0 \leq y \leq 1$ | $0 \leq z \leq 3$ |
| #4 | $2 \leq x \leq 3$ | $0 \leq y \leq 1$ | $2 \leq z \leq 3$ |
| #5 | $2 \leq x \leq 3$ | $0 \leq y \leq 1$ | $0 \leq z \leq 1$ |
| ... | ... | ... | ... |

DECODING METHOD, DECODING APPARATUS AND PROGRAM FOR DECODING PART OF AN ENTIRE POINT CLOUD IN A THREE-DIMENSIONAL SPACE

CROSS-REFERENCE TO RELATED APPLICATIONS

This application is a 371 U.S. National Phase of International Application No. PCT/JP2020/048833, filed on Dec. 25, 2020. The entire disclosure of the above application is incorporated herein by reference.

TECHNICAL FIELD

The present invention relates to a decoding method, a decoding apparatus, and a program.

BACKGROUND ART

An international standard "Geometry based Point Cloud Compression (G. pcc)" related to compression encoding of point cloud data generated using a light detection and ranging (LiDAR) scanner or the like has been studied. In the "G. pcc", it has been proposed to permit a structure of slice segmentation in order to implement partial access to encoded data of the entire point cloud (see Non Patent Document 1). The partial access means, for example, decoding only a part of the point cloud expressed in the octree structure, that is, decoding only a part of the entire point cloud. In Non Patent Document 1, a plurality of slices are associated with an octree structure in units of layers defined in a point cloud expressed by the octree structure.

CITATION LIST

Non Patent Document

Non Patent Document 1: Hyun-Mook Oh, Hyejung Hur, Sejin Oh, "INTERNATIONAL ORGANISATION FOR STANDARDISATION ORGANISATION INTERNATIONALE DE NORMALISATION ISO/IEC JTC 1/SC 29/WG 7 CODING OF MOVING PICTURES AND AUDIO," ISO/IEC JTC 1/SC 29/WG 7 m55350, Online—October 2020.

SUMMARY OF INVENTION

Technical Problem

The slice disclosed in Non Patent Document 1 is associated with the octree structure according to the order in which the portions of the point cloud are expressed when the point cloud is expressed in the octree structure. That is, the slice disclosed in Non Patent Document 1 is associated with the octree structure according to the scan order of the point cloud in the point cloud encoding.

Therefore, the arrangement order of each portion in the three-dimensional space in which the point cloud is distributed does not necessarily coincide with the slice number order of the slice associated with the octree structure. As a result, although the entire point cloud distributed in the three-dimensional space can be decoded, there is a problem that only a part of the entire point cloud cannot be decoded.

In view of the above circumstances, an object of the present invention is to provide a decoding method, a decoding device, and a program capable of decoding a part of the entire point cloud without decoding the entire point cloud distributed in a three-dimensional space.

Solution to Problem

One aspect of the present invention is a decoding method performed by a decoding device, the decoding method including steps of: acquiring, from among a plurality of slice numbers indicating a plurality of slices associated with encoded data of the entire point cloud distributed in a three-dimensional space, a first slice number indicating a first slice associated with encoded data of a point cloud of a first space that is a portion of the three-dimensional space, on the basis of a pointer indicating the first slice; and acquiring the encoded data of the point cloud of the first space on the basis of the first slice number, and decoding point cloud data of the first space from the encoded data of the point cloud of the first space.

One aspect of the present invention is a decoding device including: an acquisition unit that acquires, from among a plurality of slice numbers indicating a plurality of slices associated with encoded data of the entire point cloud distributed in a three-dimensional space, a first slice number indicating a first slice associated with encoded data of a point cloud of a first space that is a portion of the three-dimensional space, on the basis of a pointer indicating the first slice; and a decoding unit that acquires the encoded data of the point cloud of the first space on the basis of the first slice number, and decodes point cloud data of the first space from the encoded data of the point cloud of the first space.

One aspect of the present invention is a program for causing a computer to function as the above-described decoding device.

Advantageous Effects of Invention

According to the present invention, it is possible to decode a part of the entire point cloud without decoding the entire point cloud distributed in a three-dimensional space.

BRIEF DESCRIPTION OF DRAWINGS

FIG. 4 is a diagram illustrating an example of a data structure of a slice footer in the first embodiment.

DESCRIPTION OF EMBODIMENTS

Embodiments of the present invention will be described in detail with reference to the drawings.

Overview

As described above, in the related art, it is difficult to decode only a point cloud expressing a spatial region (partial space) extending over a plurality of slices. Therefore, in embodiments of the present invention, additional information (hereinafter, referred to as a "pointer") for associating the spatial region and the slice is added to overhead (for example, a slice header or a slice footer). As a result, the slice associated with a desired spatial region (partial space as a decoding target) is specified using the pointer. Hereinafter, the pointer is only required to be information that can associate a spatial region with a slice number (slice identifier), and is not limited to the pointer illustrated in each of the following embodiments.

First Embodiment

Figure 1:
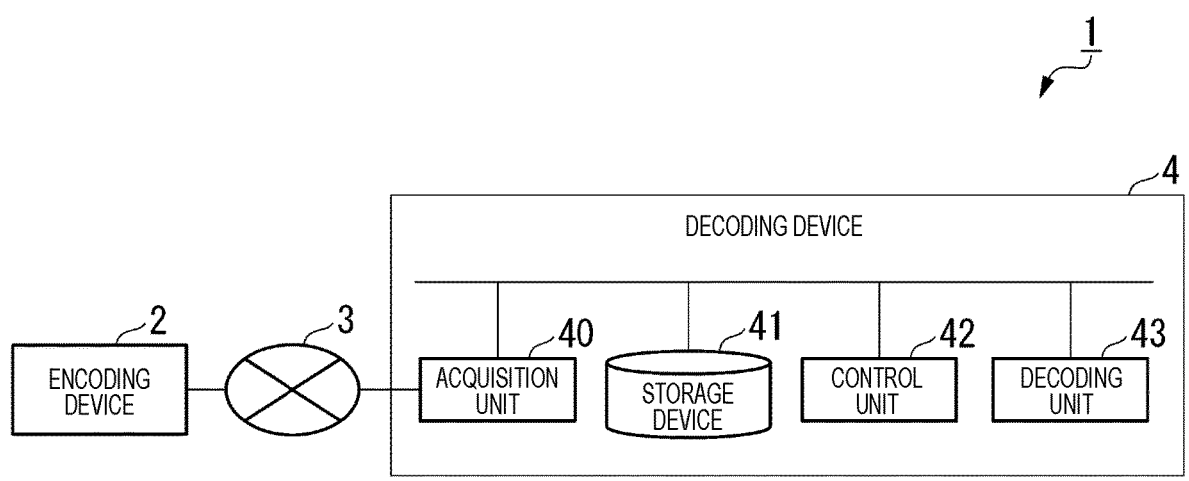
FIG. 1 is a diagram illustrating a configuration example of a point cloud data processing system according to a first embodiment.

FIG. 1 is a diagram illustrating a configuration example of a point cloud data processing system 1 according to a first embodiment. The point cloud data processing system 1 includes an encoding device 2, a communication line 3, and a decoding device 4.

The point cloud data is generated using a LiDAR scanner or the like. The encoding device 2 acquires point cloud data. The encoding device 2 generates encoded data by encoding (octree encoding) the point cloud data using a slice segmentation structure for partial access and an octree structure.

The encoding device 2 generates encoded data having the slice segmentation structure for partial access and the octree structure. For example, the encoding device 2 associates a plurality of slices with the entire generated encoded data. In a slice, a slice header and a slice footer are defined as overhead. The encoding device 2 transmits the encoded data to the decoding device 4 via the communication line 3 in units of slices.

The decoding device 4 acquires the encoded data from the encoding device 2 in units of slices. The decoding device 4 performs decoding processing on the encoded data having the slice segmentation structure for partial access and the octree structure.

Figure 2:
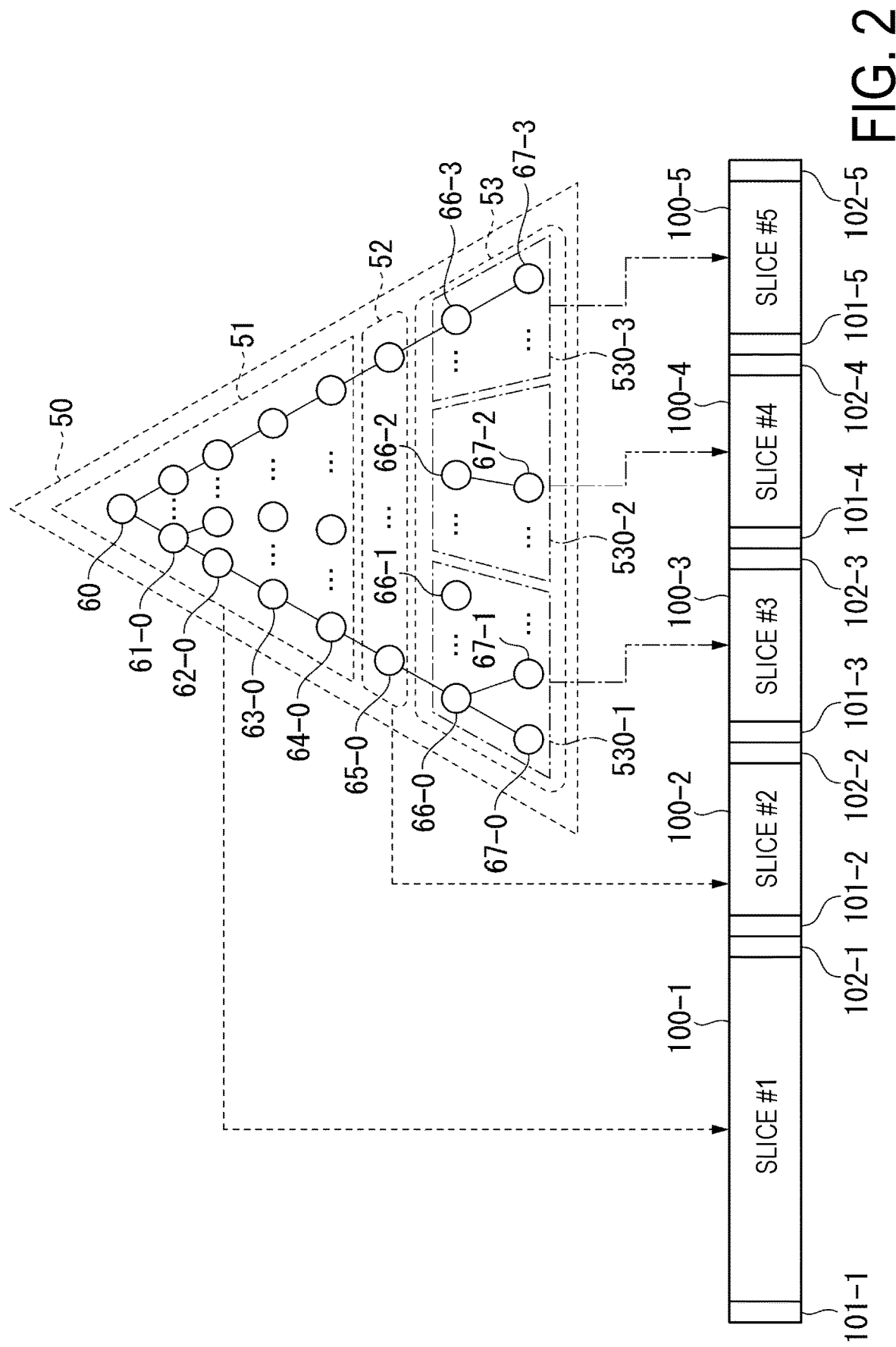
FIG. 2 is a diagram illustrating an example of an octree structure and each slice in the first embodiment.

FIG. 2 is a diagram illustrating an example of the octree structure and each slice in the first embodiment. Each node of the octree structure represents each point of the point cloud distributed in the three-dimensional space. That is, the node represents a portion constituting the three-dimensional space in which the point cloud is distributed. For example, a code "1" is assigned to a portion (node) where a point exists. For example, a code "0" is assigned to a portion where a point does not exist.

A plurality of hierarchies are defined in the encoded data having the slice segmentation structure for partial access and the octree structure. In FIG. 2, a node 60 is a node on the most root side (parent hierarchy) in the encoded data. That is, the hierarchy of the node 60 is the highest hierarchy in the encoded data. Each node 67 is a node on the most leaf side (child hierarchy) in the encoded data. That is, the hierarchy of each node 67 is the lowest hierarchy in the encoded data.

In FIG. 2, as an example, a zeroth hierarchy including the node 60, a first hierarchy including one or more nodes 61, a second hierarchy including one or more nodes 62, a third hierarchy including one or more nodes 63, a fourth hierarchy including one or more nodes 64, a fifth hierarchy including one or more nodes a sixth hierarchy including one or more nodes 66, and a seventh hierarchy including one or more nodes 67 are associated with the encoded data having the slice segmentation structure for partial access and the octree structure.

In FIG. 2, the encoded data of a group 51 including the node of the zeroth hierarchy and each node of the first hierarchy to the fourth hierarchy is associated with a slice 100-1. That is, the encoded data of the group 51 is stored in the slice 100-1. The encoded data of the group 52 including each node 65 of the fifth hierarchy is associated with a slice 100-2. The association shown in FIG. 2 is an example. For example, the group of nodes 65 in the fifth hierarchy may be associated with the plurality of slices 100-2.

In FIG. 2, encoded data of a group 53 including nodes of the sixth to seventh hierarchies is associated with a slice 100-3, a slice 100-4, and a slice 100-5. Here, as an example, the group 53 is divided into a subgroup 530-1, a subgroup 530-2, and a subgroup 530-3.

These subgroups 530 are groups to which nodes (portions) having a predetermined positional relationship in a three-dimensional space belong. The predetermined positional relationship is, for example, a relationship of being spatially adjacent. The predetermined positional relationship may be, for example, a relationship in which a distance between positions is within a predetermined distance. The predetermined positional relationship may be, for example, a relationship in which one node (portion) is a parent space and another node (portion) is a child space (space included in the parent space).

In FIG. 2, as an example, a node 66-0, a node 66-1, a node 67-0, and a node 67-1 belong to the subgroup 530-1 of the group 53. A node 66-2 and a node 67-2 belong to the subgroup 530-2 of the group 53. A node 66-3 and a node 67-3 belong to the subgroup 530-3 of the group 53.

In FIG. 2, as an example, the encoded data of the subgroup 530-1 is associated with the slice 100-3. The encoded data of the subgroup 530-2 is associated with the slice 100-4. The encoded data of the subgroup 530-3 is associated with the slice 100-5.

The slice header 101 of each slice 100 includes a group number and a subgroup number.

When the point cloud data is expressed (the point cloud is encoded) using the slice segmentation structure for partial access and the octree structure, a pointer is added to a slice footer 102 of each slice 100 associated with the octree structure or the like. The pointer indicates the slice 100 associated with a second point cloud having a predetermined positional relationship with respect to positions of the decoded first point cloud regarding the position in the three-dimensional space. The slice footer is an example of a position where the pointer is defined as an element. For example, the position where the pointer is defined as an element may be a slice header. As long as the spatial region (partial space) and the slice number can be associated with each other, the position where the pointer is defined as an element is not limited to the overhead such as the slice header or the slice footer, and is not limited to a specific position.

Figure 3:
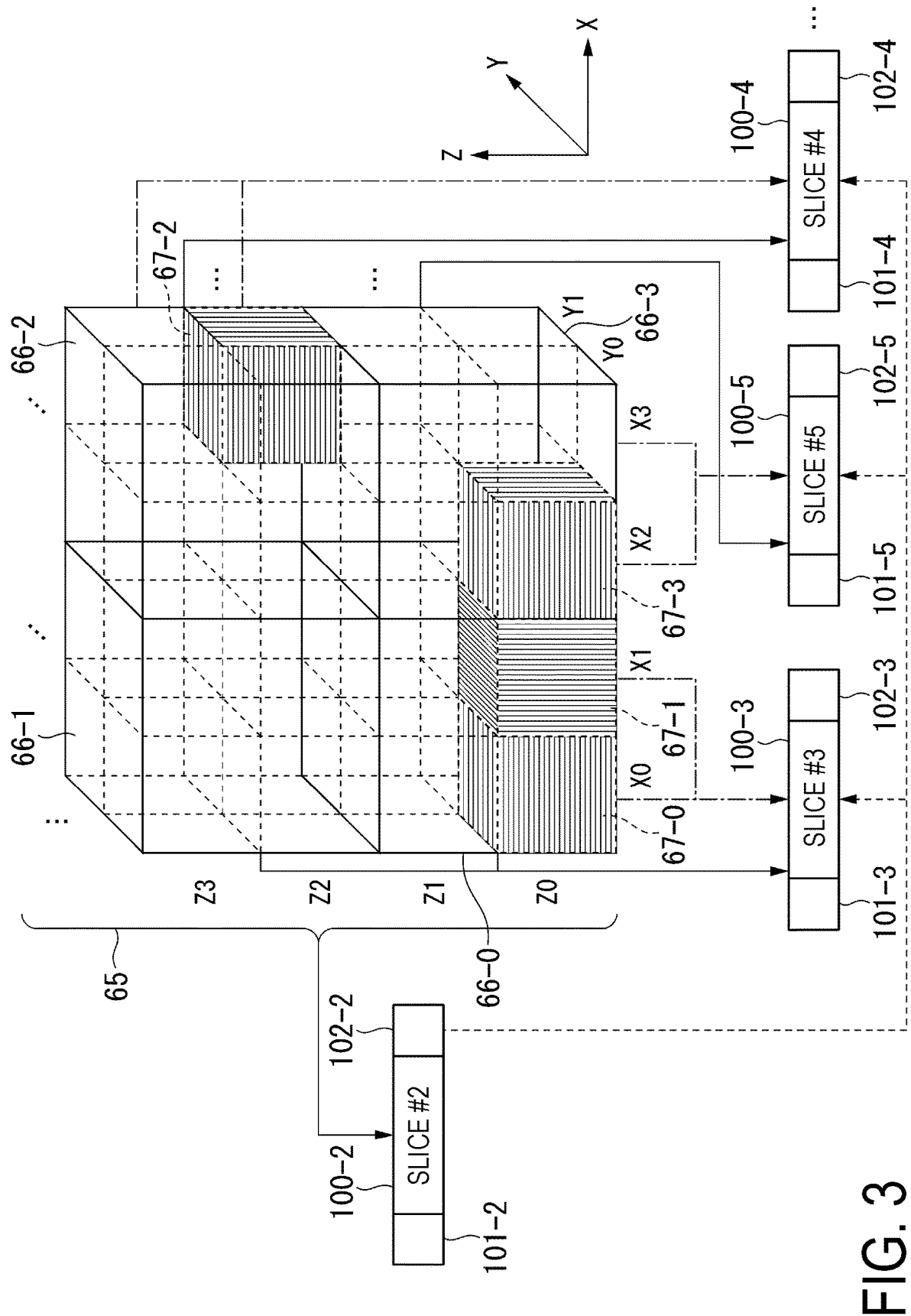
FIG. 3 is a diagram illustrating an example of each space and each slice having a predetermined positional relationship in the first embodiment.

FIG. 3 is a diagram illustrating an example of each space and each slice having a predetermined positional relationship in the first embodiment. In FIG. 3, the first space (the group of nodes 65 of the group 52 illustrated in FIG. 2) associated with the slice 100-2 includes the second space (the space including the node 66-0 and the node 66-1) associated with the slice 100-3. The space of the node 66-0 includes, as an example, a space including the node 67-0 and the node 67-1.

In FIG. 3, as a predetermined positional relationship, the node 66-0 and the node 66-3 are adjacent to each other. As a predetermined positional relationship, the node 66-2 and the node 66-3 are adjacent to each other. As a predetermined positional relationship, the node 66-1 and the node 66-2 are adjacent to each other. As a predetermined positional relationship, a distance between positions of the node 66-0, the node 66-1, the node 66-2, and the node 66-3 is within a predetermined distance.

A slice footer 102-2 includes a slice number "#3" as a pointer to a slice 100-3 corresponding to a hierarchy (child hierarchy) lower than the hierarchy corresponding to the slice 100-2. The slice footer 102-2 includes a slice number "#4" as a pointer to a slice 100-4. The slice footer 102-2 includes a slice number "#5" as a pointer to a slice 100-5. That is, the pointer is configured such that the slice number of the slice on the leaf side belonging to the slice can be specified on the basis of the slice on the root side of the octree structure. The slice footer 102-2 may include not only the slice number but also information indicating the arrangement order of the node 66, the node 67, and the like in the three-dimensional space.

Next, the decoding device 4 will be described.

The decoding device 4 includes an acquisition unit 40, a storage device 41, a control unit 42, and a decoding unit 43. The acquisition unit 40 acquires encoded data of the entire point cloud from the encoding device 2. The acquisition unit 40 records encoded data of the entire point cloud in the storage device 41.

The acquisition unit 40 acquires the pointer indicating the first slice associated with the encoded data of the point cloud of the first space, which is a portion of the three-dimensional space, from the slice header 101 or the slice footer 102 of the slice 100 from among the plurality of slice numbers indicating the plurality of slices 100 associated with the encoded data of the entire point cloud distributed in the three-dimensional space.

Here, decoding can be performed without depending on other slices, and a slice (slice on the root side) including a point (spatial region) as a decoding target is specified as the first slice as a decoding target. The first slice as a decoding target is specified as in any one of (1) to (4), for example.

(1) In a case where there is one octree in an octree structure, a slice with the slice number "#0" is specified.

(2) On the basis of a tile inventory defined for the octree structure (see Reference Document 1 ("Information technology—MPEG-I (Coded Representation of Immersive Media)—Part 9: Geometry-based Point Cloud Compression", ISO/IEC 23090-9:2020 (E), ISO/IEC JTC 1/SC 29/WG 11)), a tile number (identifier) of a tile including a spatial region as a decoding target in the octree structure is specified. By collating the tile number of this tile with the slice number (slice tag), the first slice as a decoding target associated with the spatial region as a decoding target is searched for.

(3) A slice in which "gsh_entropy_continuation_flag" (see Reference Document 1) in a slice header is false and a bounding box in the slice header includes a spatial region as a decoding target is searched for.

(4) A syntax table indicating a slice corresponding to independently decodable point (node) in the octree structure is separately defined.

As illustrated in FIG. 2, the acquisition unit 40 acquires the pointer indicating the slice 100-2 (first slice) associated with the encoded data of the group of nodes 65 of the group 52 from the overhead (the slice header 101 or the slice footer 102) of the slice 100-1. The acquisition unit 40 acquires the slice number "#2" (first slice number) as a pointer. That is, the acquisition unit 40 acquires the slice number "#2" on the basis of the pointer.

The acquisition unit 40 acquires the second slice number indicating the second slice associated with the encoded data of the point cloud of the second space on the basis of the pointer indicating the second slice associated with the encoded data belonging to the hierarchy (child hierarchy) lower than the hierarchy to which the encoded data of the first slice belongs.

For example, the acquisition unit 40 acquires the slice number "#3" indicating the slice 100-3 (second slice) associated with the encoded data of the node 66-0 and the node 66-1 (second space) from the slice header 101-2 on the basis of the pointer indicating the slice 100-3 associated with the encoded data belonging to the child hierarchy of the hierarchy to which the encoded data of the slice 100-2 (first slice) belongs. As similar to this, the acquisition unit 40 acquires the slice number "#3" indicating the slice 100-3 and the slice number "#5" indicating the slice 100-5 from the slice header 101-2.

The node 66-0 and the node 66-3 have a positional relationship of being adjacent to each other in a three-dimensional space. The node 66-0 and the node 66-2 have a positional relationship of being close to each other in a three-dimensional space. As described above, the slice 100-3 associated with each node (each node of the child hierarchy) included in the node 65 associated with the slice 100-2 and pointers respectively indicating the slices 100-2, 100-3 are added to the slice footer 102-2.

As in the example described above, the decoding unit 43 decodes the point cloud in order from the slice on the root side. The acquisition unit 40 acquires, from the decoded slice on the root side, the slice number on the leaf side belonging to the slice. In a case where there is a slice number indicating a slice corresponding to a desired spatial region among slice numbers on the leaf side, the decoding unit 43 decodes the entire slice indicated by the slice number.

The decoding device 4 performs such decoding processing for each slice up to the lowermost layer (the most leaf side). The order of the processing targets is not limited. For example, the decoding unit 43 confirms and decodes all the child slices, and then advances the processing for the grandchild hierarchy. Alternatively, when the processing proceeds in the order from the child hierarchy to the grandchild hierarchy and there is no decoding target, the decoding unit 43 may return the processing target from the grandchild hierarchy to the child hierarchy or from the child hierarchy to the parent hierarchy. In this case, the information added to the slice footer may be, for example, only the slice number of the slice on the leaf side belonging to the slice on the root side, or may be both the number of slices on the leaf side directly belonging to the slice on the root side and the slice number of the slice on the leaf side belonging to the slice on the root side.

When entropy encoding of a geometry tree structure (octree structure) included in a slice on the leaf side is performed depending on a slice on the root side, or when encoding of attribute information corresponding to the geometry tree structure (octree structure) depends on a slice on the root side, a slice on the root side also needs as a decoding target. When there is no dependency regarding decoding and it is not necessary to decode other regions in the geometry tree structure, decoding processing other than the slice header and the slice footer of the slice on the root side may be skipped.

The acquisition unit 40 acquires all the slice numbers of the slices (hereinafter, referred to as a "child slice") of the child hierarchy from the slice footer of the slice of the parent hierarchy. The decoding unit 43 refers to bounding box information in the slice header of each child slice to determine whether the spatial region as a decoding target is included in the child slice. The slice header includes an element for specifying the cover range of the bounding box in the encoded data.

The storage device 41 stores the encoded data of the entire point cloud. The control unit 42 controls the operation of each functional unit of the decoding device 4. For example, the control unit 42 outputs the slice number of the slice 100 associated with the point cloud (node group) selected as the first decoding target to the acquisition unit 40 according to the operation by the user.

The decoding unit 43 acquires the encoded data of the point cloud of the first space on the basis of the first slice number. The decoding unit 43 decodes the point cloud data of the first space from the encoded data of the point cloud of the first space. For example, the decoding unit 43 acquires the encoded data of the group of nodes 65 of the group 52 on the basis of the slice number "#2" (first slice number). The decoding unit 43 decodes each node of the group 52 from the encoded data of the group 51 associated with the slice 100-1 and the encoded data of the group 52 associated with the slice 100-2.

The decoding unit 43 acquires the encoded data of the point cloud of the second space on the basis of the second slice number. The decoding unit 43 decodes the point cloud data of the second space from the encoded data of the point cloud of the second space. For example, the decoding unit 43 acquires the encoded data of the subgroup 530-1 on the basis of the slice number "#3" (second slice number). The decoding unit 43 decodes the node 66-0 and the node 66-1 from the encoded data of the group 51, the encoded data of the group 52, and the encoded data of the subgroup 530-1. As similar to this, the decoding unit 43 may decode the node 66-3 from the encoded data of the group 51, the encoded data of the group 52, and the encoded data of the subgroup 530-3. The decoding unit 43 may decode the node 66-2 from the encoded data of the group 51, the encoded data of the group 52, and the encoded data of the subgroup 530-2.

FIG. 4 is a diagram illustrating an example of a data structure of the slice footer 102 in the first embodiment. A plurality of slices are associated with a geometry tree structure that is a point cloud (node group) of the octree structure.

The slice footer 102 of each slice 100 has, by way of example, the data structure illustrated in FIG. 4. The data structure of the slice footer 102 is, for example, a data structure in which an element is added to the geometry data unit footer (geometry_data_unit_footer( )) (see Reference Document 1).

The slice footer having the data structure illustrated in FIG. 4 has a variable "num_neighbour_slices_minus1" as an element. The variable "num_neighbour_slices_minus1" represents a value of a result of subtracting 1 from the number of slices associated with a node (portion) having a predetermined positional relationship in the three-dimensional space.

The slice footer having the data structure illustrated in FIG. 4 has a pointer variable "neigbour_slice_id" as an element. The value of the pointer variable "neigbour_slice_id" is a slice number indicating a slice associated with a node (portion) having a predetermined positional relationship in the three-dimensional space.

Information on the data structure illustrated in FIG. 4 may be included in a slice header instead of being included in a slice footer. As long as information can be provided as an overhead, a position at which information of the data structure illustrated in FIG. 4 is included is not limited to a specific position.

Next, an operation example of the point cloud data processing system 1 will be described.

Figure 5:
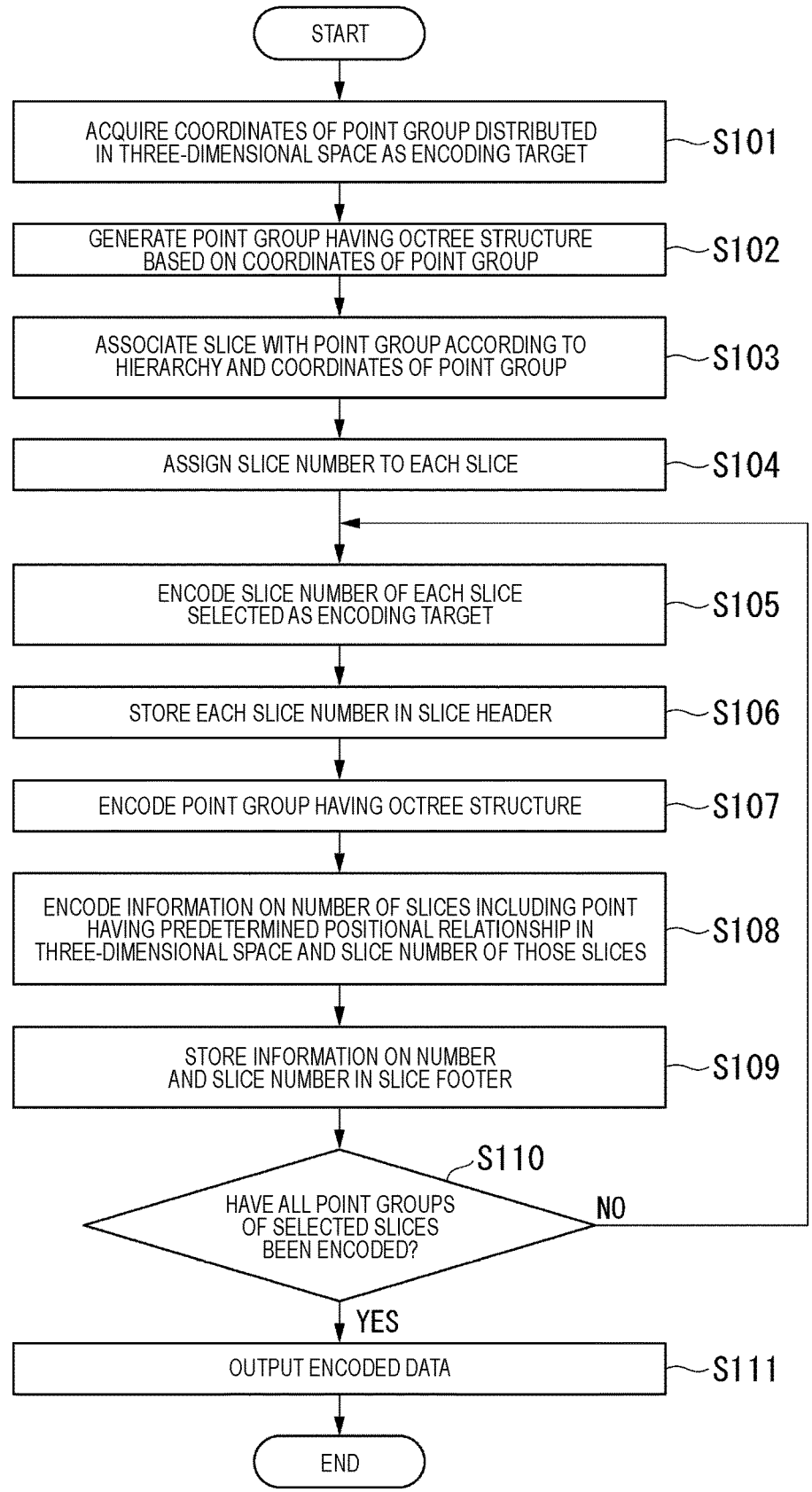
FIG. 5 is a flowchart illustrating an operation example of an encoding device in the first embodiment.

FIG. 5 is a flowchart illustrating an operation example of the encoding device 2 in the first embodiment. The encoding device 2 acquires coordinates (point cloud data) of a point cloud distributed in a three-dimensional space as an encoding target (step S101). The encoding device 2 generates a point cloud having an octree structure (geometry tree structure) on the basis of the coordinates of the point cloud (step S102). The encoding device 2 associates the slice 100 with the point cloud according to the depth of the hierarchy to which the point cloud belongs in the octree structure and the position of the point cloud in the octree structure (step S103). The encoding device 2 assigns a slice number to each slice 100 (step S104).

The encoding device 2 encodes the slice number of each slice 100 selected as the encoding target (step S105). The encoding device 2 stores each slice number in the slice header 101 (step S106). The encoding device 2 generates encoded data by encoding a point cloud having an octree structure (step S107). The encoding device 2 encodes information on the number of slices including points having a predetermined positional relationship in a three-dimensional space and slice numbers of the slices 100 (step S108). The encoding device 2 stores the information on the number of the slices 100 and the slice numbers in the slice footer 102 (step S109).

The encoding device 2 determines whether all the point clouds of the selected slice 100 have been encoded (step S110). When it is determined that any of the point clouds is not encoded (step S110: NO), the encoding device 2 causes the process to return to step S105.

When it is determined that all the point clouds of the selected slice 100 have been encoded (step S110: NO), the encoding device 2 outputs the encoded data to the decoding device 4 for each slice 100 having the slice footer 102 (step S111).

Figure 6:
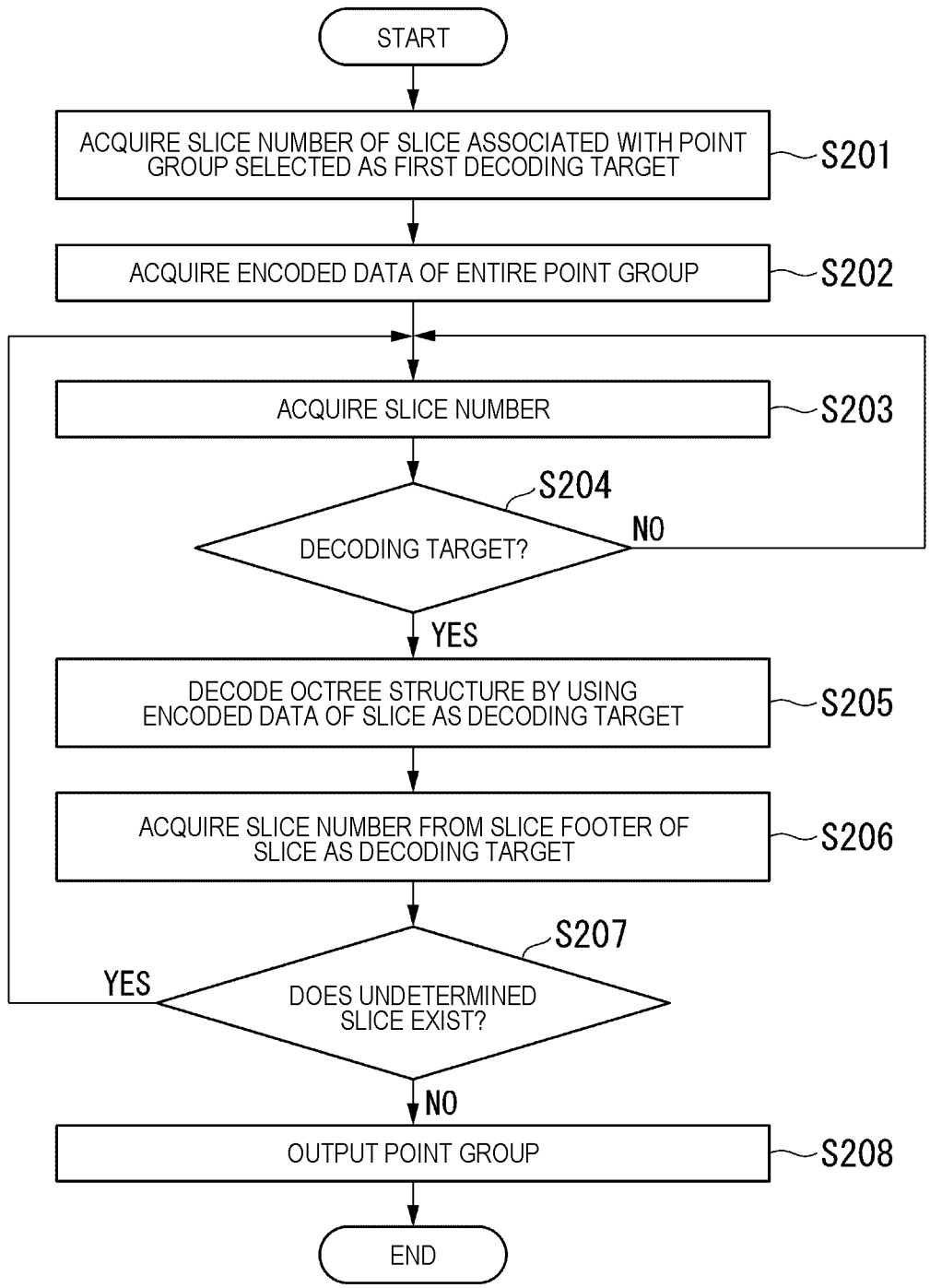
FIG. 6 is a flowchart illustrating an operation example of a decoding device in the first embodiment.

FIG. 6 is a flowchart illustrating an operation example of the decoding device 4 in the first embodiment. The acquisition unit 40 acquires the slice number of the slice 100 associated with the point cloud selected as the first decoding target from the control unit 42 (step S201). The acquisition unit 40 acquires the encoded data of the entire point cloud from the storage device 41 (step S202).

The acquisition unit 40 selects the slice 100 from the encoded data of the entire point cloud. The acquisition unit 40 acquires a slice number indicating the selected slice 100. For example, in a case where the slice number is not acquired from the slice footer 102 in step S206, the acquisition unit 40 acquires the slice number from the slice header of the slice 100. For example, in a case where the slice number is acquired from the slice footer 102 in step S206, the acquisition unit 40 handles the slice number acquired from the slice footer 102 of the slice 100 as the slice number indicating the selected slice 100 (step S203).

The acquisition unit 40 determines whether the acquired slice number is the same as the slice number of the slice 100 associated with the point cloud selected as the decoding target. That is, the acquisition unit 40 determines whether the slice 100 having the slice number acquired from the slice header 101 is the slice 100 associated with the point cloud as a decoding target (step S204).

When it is determined that the slice 100 of the acquired slice number is not the slice 100 associated with the point cloud as a decoding target (step S204: NO), the acquisition unit 40 causes the process to return to step S203.

When it is determined that the slice 100 having the slice number acquired from the slice header 101 is the slice 100 associated with the point cloud as a decoding target (step S204: YES), the decoding unit 43 decodes the point cloud having the octree structure using the encoded data of the point cloud associated with the slice 100 as a decoding target (step S205).

The acquisition unit 40 acquires the slice number of the slice 100 as a decoding target next from the slice footer 102 of the slice 100 as a decoding target (step S206). Here, the portion associated with the slice 100 as a decoding target and the portion associated with the slice 100 as a decoding target next have a predetermined positional relationship (for example, a positional relationship of being adjacent to each other) in the three-dimensional space. In a case where all the slice numbers included in the slice footer 102 have been acquired, the acquisition unit 40 stops the processing of acquiring the slice numbers and the process proceeds to step S207.

The acquisition unit 40 determines whether there is an undetermined slice 100 (step S207). When it is determined that there is an undetermined slice 100 (step S207: YES), the acquisition unit 40 causes the process to return to step S203. When it is determined that all the slices 100 have been determined (step S207: NO), the decoding unit 43 outputs the point cloud data to the storage device 41 (step S208).

As described above, the acquisition unit 40 (acquirer) acquires the first slice number from predetermined overhead (for example, the slice footer 102) on the basis of the pointer (additional information) indicating the first slice associated with the encoded data of the point cloud of the first space which is the portion of the three-dimensional space. For example, the acquisition unit 40 acquires the first slice number "#2" from the overhead (for example, the slice header 101-1 or slice footer 102-1) of the slice 100-2 on the basis of the pointer indicating the slice 100-1 associated with the encoded data of the group of nodes (first space) of the group 52. The decoding unit 43 (decoder) acquires the encoded data of the point cloud of the first space on the basis of the first slice number (for example, "#2"). The decoding unit 43 decodes the point cloud data of the first space from the encoded data of the point cloud of the first space.

The acquisition unit 40 may acquire the second slice number indicating the second slice associated with the encoded data of the point cloud of the second space on the basis of the pointer indicating the second slice associated with the encoded data belonging to the child hierarchy of the hierarchy to which the encoded data of the first slice belongs. For example, the acquisition unit 40 may acquire the second slice number "#3" indicating the slice 100-3 (first slice) associated with the encoded data of the space (second space) including the node 66-0 and the node 66-1 on the basis of the pointer indicating the slice 100-3 (second slice) associated with the encoded data belonging to the child hierarchy (subgroup 530-1) of the group 52 to which the encoded data of the slice 100-2 (first slice) belongs. The decoding unit 43 acquires the encoded data of the point cloud of the second space on the basis of the second slice number (for example, "#3"). The decoding unit 43 decodes the point cloud data of the second space from the encoded data of the point cloud of the second space.

As a result, since it is possible to specify a slice required for decoding in a case where a portion of the three-dimensional space is pinpointed as a decoding target, it is possible to decode a part of the entire point cloud without decoding the entire point cloud distributed in the three-dimensional space.

Regardless of whether or not the point cloud of a part of the entire point cloud is associated with a plurality of slices, the part of the point cloud of can be decoded. Even if a slice of a part of the encoded data is lost, a point cloud corresponding to another slice can be decoded.

(Modification of First Embodiment)

In a case where a pointer to a slice of a leaf side hierarchy is determined on the basis of a slice of a root side hierarchy (a case where a pointer is held by a slice indirectly via a group)

In a case where a slice header of a hierarchy on a root side holds a group number or a subgroup number, a data table or a tree indicating a parent-child relationship of the group and the subgroup is separately defined.

The decoding unit 43 decodes the point cloud sequentially from the root of the octree structure. The decoding unit 43 specifies a child slice with reference to a tree indicating a parent-child relationship between a group and a subgroup. The decoding unit 43 determines whether the spatial region as a decoding target is included in the child slice on the basis of the information regarding the bounding box included in the slice header of the child slice. When the result is true (when the spatial region as a decoding target is included in the child slice), the decoding unit 43 decodes the child slice.

The order of the processing targets is not limited. The decoding unit 43 confirms and decodes all the child slices, and then advances the processing for a grandchild hierarchy. When the processing proceeds in the order from the child hierarchy to the grandchild hierarchy and there is no decoding target, the decoding unit 43 may return the processing target from the grandchild hierarchy to the child hierarchy or from the child hierarchy to the parent hierarchy.

Element (slice header or slice footer)

Group number or subgroup number

Element (entirely)

Data table of group structure or tree of group structure

As described above, the group number or the subgroup number is added to the slice header of the slice on the root side. A table or a tree indicating a parent-child relationship between the group and the subgroup to which the slice belongs may be added to the slice header or the independent syntax table of the slice on the root side.

Only a data table or a tree of a group and a subgroup having the slice on the root side as the top (the most root side) may be added to the slice header or an independent syntax table. In this case, the decoding unit 43 may decode the point cloud (partial space) sequentially from the slice on the root side. The decoding unit 43 may decode a slice on the leaf side associated with the region (partial space) as a decoding target and a slice on the root side (upper side) of the slice with reference to the data table or the tree. In this case, additional information indicating the group number or the subgroup number and the parent-child relationship thereof may be added to the slice header or the independent syntax table.

In the above-described modification, a data table or a tree indicating a parent-child relationship of at least one of a group and a subgroup is used. In the above-described modification, instead of at least one of the group and the subgroup, a data table or a tree indicating a parent-child relationship of the slice itself may be used. Then, the data table or the tree may be added to at least one of the group and the subgroup, an independent syntax table, or the like. The decoding unit 43 determines whether the spatial region as a decoding target is included in the slice by referring to, for example, a data table added to the slice header on the root side. The decoding unit 43 may determine whether the spatial region as a decoding target is included in the slice by a determination method similar to the determination method illustrated in the above-described modification and the like.

Second Embodiment

In the first embodiment, the encoded data of the first slice associated with the encoded data of the point cloud of the first space (first portion) and the encoded data of the second slice associated with the encoded data of the point cloud of the second space (second portion) belong to different hierarchies among a plurality of hierarchies determined for the entire encoded data expressed using the slice segmentation structure for partial access and the octree structure.

On the other hand, in the second embodiment, the encoded data of the first slice associated with the encoded data of the point cloud of the first space (first portion) and the encoded data of the second slice associated with the encoded data of the point cloud of the second space (second portion) belong to the same hierarchy among a plurality of hierarchies determined for the entire encoded data expressed using the slice segmentation structure for partial access and the octree structure. This point is a difference from the first embodiment. The second embodiment is described by focusing on the differences from the first embodiment.

Figure 7:
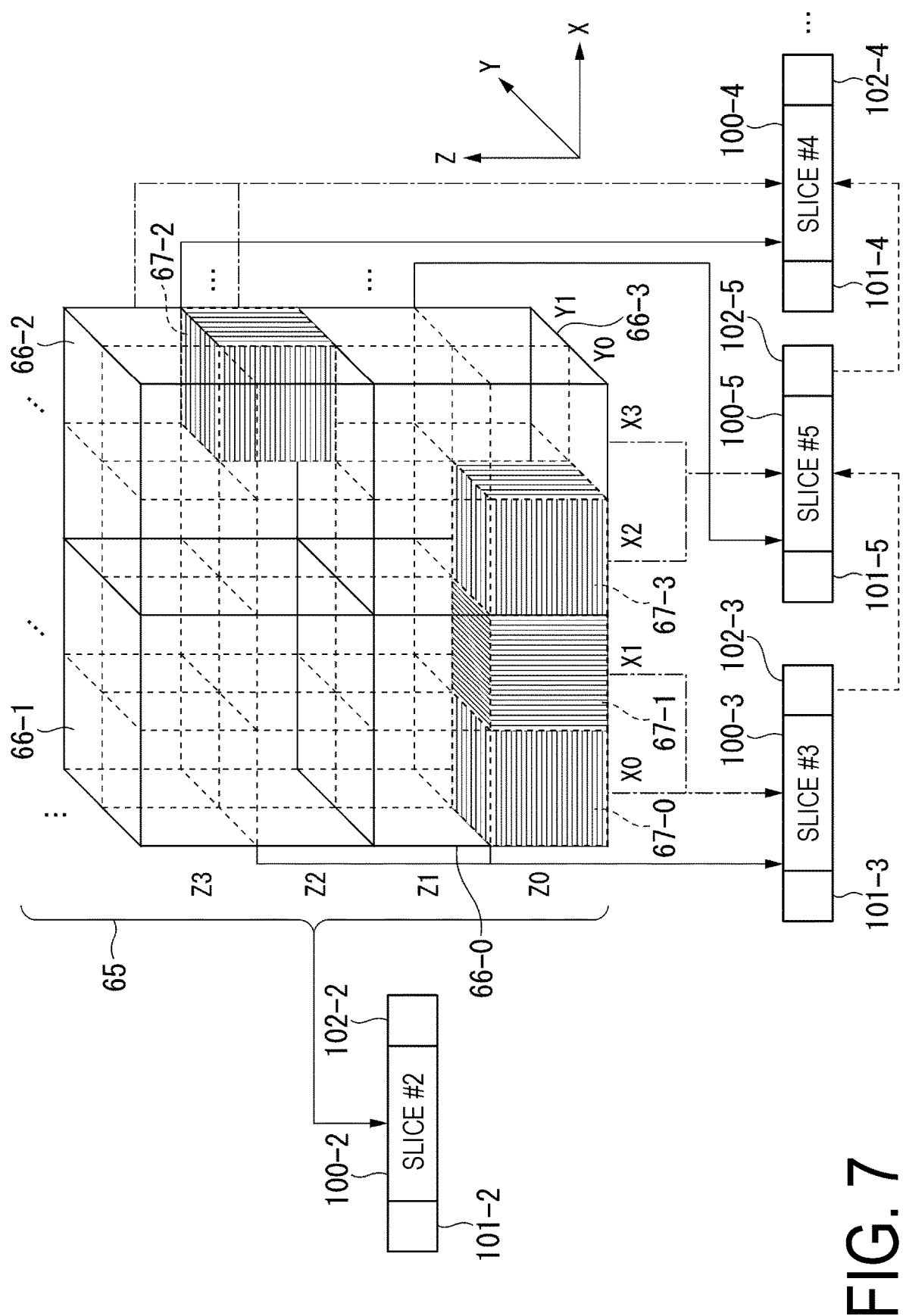
FIG. 7 is a diagram illustrating an example of each space and each slice having a predetermined positional relationship in a second embodiment.

FIG. 7 is a diagram illustrating an example of each space and each slice having a predetermined positional relationship in the second embodiment. In FIG. 7, the first space (space including the node 66-0, node 66-1, node 66-2, and node 66-3) associated with the slice 100-2 includes the second space (space including the node 66-0 and the node 66-1) associated with the slice 100-3. The space of the node 66-0 includes, as an example, a space including the node 67-0 and the node 67-1.

In FIG. 7, as a predetermined positional relationship, the node 66-0 and the node 66-3 are adjacent to each other. As a predetermined positional relationship, the node 66-2 and the node 66-3 are adjacent to each other. As a predetermined positional relationship, the node 66-1 and the node 66-2 are adjacent to each other. As a predetermined positional relationship, a distance between positions of the node 66-0, the node 66-1, the node 66-2, and the node 66-3 is within a predetermined distance.

A slice footer 102-3 includes a slice number "#5" as a pointer to a slice 100-5 corresponding to the same hierarchy as the hierarchy corresponding to the slice 100-3. A slice footer 102-5 includes a slice number "#4" as a pointer to a slice 100-4 corresponding to the same hierarchy as the hierarchy corresponding to the slice 100-5.

The acquisition unit 40 acquires the second slice number indicating the second slice associated with the encoded data of the point cloud of the second space on the basis of the pointer indicating the second slice associated with the encoded data belonging to the same hierarchy as the hierarchy to which the encoded data of the first slice belongs.

For example, the acquisition unit 40 acquires the slice number "#5" (second slice number) indicating the slice 100-5 associated with the encoded data of the node 66-3 from the slice footer 102-3 (overhead of the first slice) of the slice 100-3 on the basis of the pointer indicating the slice 100-5 (second slice) associated with the encoded data belonging to the same hierarchy as the hierarchy to which the encoded data of the slice 100-3 (first slice) belongs to. As similar to this, the acquisition unit 40 acquires the slice number "#4" indicating the slice 100-4 (third slice) from the slice footer 102-5 (overhead of the second slice) of the slice 100-5 (second slice).

The node 66-0 and the node 66-3 have a predetermined positional relationship (for example, a positional relationship of being adjacent to each other) in a three-dimensional space. The node 66-0 and the node 66-2 have a predetermined positional relationship (for example, a positional relationship of being close to each other) in a three-dimensional space. As described above, a pointer indicating the slice 100-5 associated with the node 66-3 adjacent to the node 66-0 associated with the slice 100-3 is added to the slice footer 102-3. A pointer indicating the slice 100-4 associated with the node 66-2 adjacent to the node 66-3 associated with the slice 100-5 is added to the slice footer 102-5.

A case where a pointer to another slice of the same hierarchy as a predetermined hierarchy is determined on the basis of a slice of the predetermined hierarchy (a case where a pointer is directly held by a slice) will be described. The spatial region as a decoding target is included in any of the adjacent spatial regions. The spatial region indicated by the slice to which the pointer is added and the slice number of the spatially adjacent spatial region are indicated by the pointer.

Precondition: The spatial region as a decoding target is included in any of the adjacent spatial regions. Only adjacent slice numbers are held as overhead.

The decoding unit 43 decodes the current slice. The decoding unit 43 specifies a slice associated with a spatial region (partial space) adjacent to the spatial region corresponding to the decoded slice along the pointer indicated in the slice header of the decoded slice. The decoding unit 43 determines whether the spatial region as a decoding target is included in the specified slice on the basis of the information regarding the bounding box included in the slice header of the specified slice. When the result is true (when the spatial region as a decoding target is included in the slice), the decoding unit 43 decodes the slice. The decoding unit 43 performs such processing on a slice including an adjacent spatial region. When all the slices corresponding to all the spatial regions as a decoding target are determined, the decoding unit 43 may suspend the slice determination processing at the time of determination. The decoding unit 43 specifies slice numbers of all slices necessary for decoding on the basis of the slice numbers indicating the slices (slices necessary for decoding) having the dependency relationship included in the slice header of this slice. The decoding unit 43 decodes the point cloud on the basis of each slice of slice numbers of all slices necessary for decoding.

Element

The number of slices associated with an adjacent spatial region (partial space).

Slice numbers (for each slice) of slices associated with adjacent spatial regions (partial space).

As described above, the acquisition unit 40 acquires the first slice number on the basis of the pointer indicating the first slice associated with the encoded data of the point cloud of the first space which is the portion of the three-dimensional space. For example, the acquisition unit 40 acquires the first slice number "#3" on the basis of the pointer indicating the slice 100-3 (first slice) associated with the encoded data of the node 66-0 and the node 66-1 (first space). The decoding unit 43 acquires the encoded data of the point cloud of the first space on the basis of the first slice number. The decoding unit 43 decodes the point cloud data of the first space from the encoded data of the point cloud of the first space.

As a result, it is possible to decode a part of the entire point cloud without decoding the entire point cloud distributed in a three-dimensional space.

The acquisition unit 40 may acquire the second slice number (for example, "#5") indicating the second slice associated with the encoded data of the point cloud of the second space (for example, node 66-3) on the basis of the pointer (for example, the pointer added to the overhead of the first slice) indicating the second slice (for example, the slice 100-5) associated with the encoded data belonging to the same hierarchy as the hierarchy to which the encoded data of the first slice belongs. The decoding unit 43 acquires the encoded data of the point cloud of the second space on the basis of the second slice number. The decoding unit 43 decodes the point cloud data of the second space from the encoded data of the point cloud of the second space.

(Modification of Second Embodiment)

A case where a pointer to another slice of the same hierarchy as a predetermined hierarchy is determined on the basis of a slice of the predetermined hierarchy (a case where a pointer is held by a slice indirectly via a group)

In a case where the slice header holds the group number or the subgroup number, a data table or a graph indicating the adjacency relationship of the spatial region of the group or the subgroup is separately defined.

The decoding unit 43 decodes the current slice. The decoding unit 43 specifies a slice associated with an adjacent spatial region (partial space) along the graph. The decoding unit 43 determines whether the spatial region as a decoding target is in a slice on the basis of information regarding a bounding box in a slice header of a slice associated with an adjacent spatial region (partial space). When the result is true (when the spatial region as a decoding target is included in the slice), the decoding unit 43 sets the slice as the decoding target. The decoding unit 43 specifies slice numbers of all slices necessary for decoding on the basis of the slice numbers indicating the slices (slices necessary for decoding) having the dependency relationship included in the slice header of this slice. The decoding unit 43 decodes the point cloud on the basis of all slices necessary for decoding.

Element (slice header or slice footer)
Group number or subgroup number
Element (entirely)
Data table or graph representing group structure Third Embodiment A third embodiment is different from the first embodiment and the second embodiment in that the association between the position in the three-dimensional space in which the point cloud is distributed and all the slice numbers is registered in the data table. In the third embodiment, differences from the first embodiment and the second embodiment will be mainly described.

Figures 8, 9:
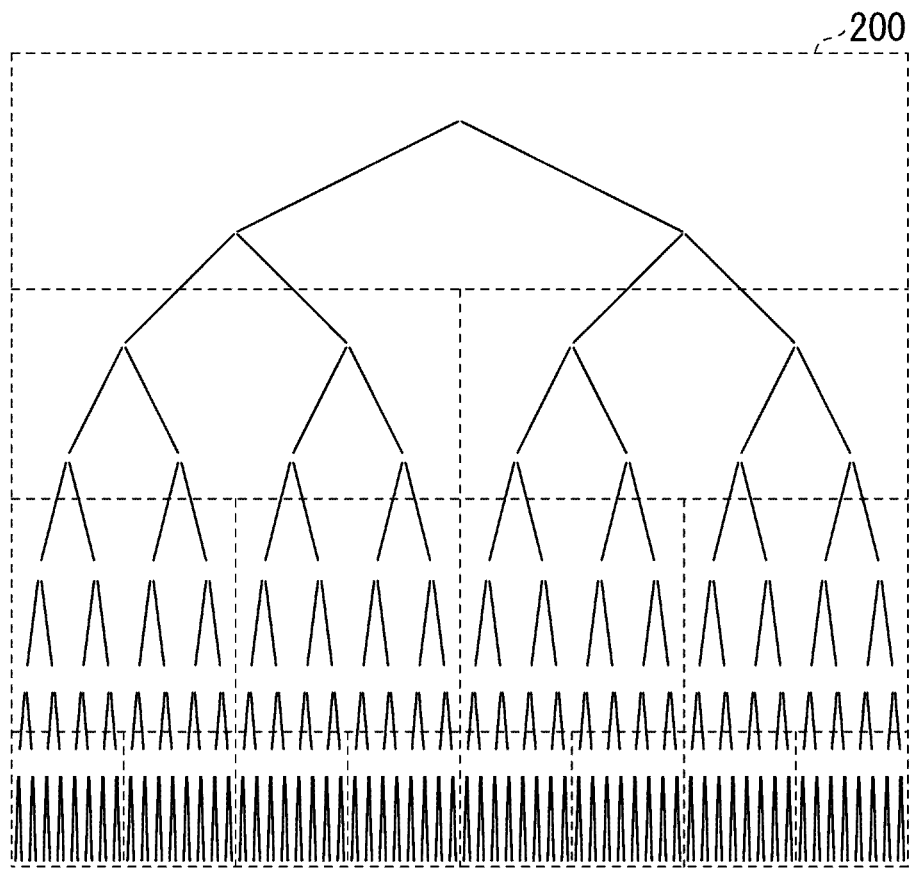
FIG. 8 is a diagram illustrating an example of a data table in a third embodiment.
FIG. 9 is a diagram illustrating an example of a bounding box defined in encoded data in a first modification of the third embodiment.

FIG. 8 is a diagram illustrating an example of a data table in the third embodiment. The data table in the third embodiment represents association between each position in a three-dimensional space in which a point cloud is distributed and a plurality of slice numbers. In the data table illustrated in FIG. 8, for example, the position associated with the slice number "#5" is a range from 2 to 3 in the X-axis direction, a range from 0 to 1 in the Y-axis direction, and a range from 0 to 1 in the Z-axis direction. That is, the position of the node 66-3 associated with the slice number "#5" is in these ranges.

The expression method of the range of the position (coordinates) is not limited to the expression method using the set of boundary values. For example, the expression method of the range of the position (coordinates) may be an expression method using the origin of the bounding box and the box size.

Furthermore, the expression method of the range of the position (coordinates) may be an expression method using a Morton number.

The encoding device 2 generates such a data table at the time of encoding the point cloud. The encoding device 2 adds a data table to a header of encoded data, for example. The encoding device 2 may add a data table to, for example, a "Sequence parameter set" (see Reference Document 1) of encoded data. The encoding device 2 may add a data table to "Geometry parameter set" (see Reference Document 1) of encoded data, for example.

The acquisition unit 40 acquires the encoded data from the encoding device 2 in units of slices. The acquisition unit 40 acquires the data table from the encoding device 2. The decoding unit 43 performs decoding processing on the encoded data having the slice segmentation structure for partial access and the octree structure.

The decoding unit 43 refers to the data table and selects the slice number of the slice 100 required when decoding the point cloud having the predetermined positional relationship.

For example, in FIG. 7, the X coordinate "X1" of the node 66-0 and the X coordinate "X2" of the node 66-3 are adjacent to each other. On the other hand, in FIG. 8, "1" of the X coordinate "0≤x≤1" corresponding to the slice number "#3" and "2" of the X coordinate "2≤x≤3" corresponding to the slice number "#5" are adjacent to each other.

For example, in FIG. 7, the Y coordinate "Y0 and Y1" of the node 66-0 and the Y coordinate "Y0 and Y1" of the node 66-3 are common. On the other hand, in FIG. 8, the Y coordinate "0≤y≤1" corresponding to the slice number "#3" and the Y coordinate "0≤y≤1" corresponding to the slice number "#5" are common.

For example, in FIG. 7, a partial range of the Z coordinate "Z0 to Z3" of the node 66-0 is common to the Z coordinate "Z0 to Z1" of the node 66-3. On the other hand, in FIG. 8, a partial range of the Z coordinate "0≤z≤3" corresponding to the slice number "#3" and the Y coordinate "0<x≤1" corresponding to the slice number "#5" are common.

Therefore, the decoding unit 43 decodes the node 66-0 and the node 66-1 associated with the slice 100-3 indicated by the slice number "#3" from the encoded data of the slice 100-1, the encoded data of the slice 100-2, and the encoded data of the slice 100-3. The decoding unit 43 decodes the node 66-0 and the node 66-1 associated with the slice 100-3 indicated by the slice number "#3" from the encoded data of the slice 100-1, the encoded data of the slice 100-2, and the encoded data of the slice 100-3. In this manner, the node 66-0 and the node 66-1 and the node 66-3 adjacent to the node 66-0 are decoded.

Instead of the slice number, a group number or a subgroup number (identifier) may be used. Not only additional information is added to "Sequence parameter set syntax" or "Geometry parameter set syntax" (see Reference Document 1), but also an independent syntax table (for example, "tile inventory" (see Reference Document 1)) may be defined. The additional information may be created as a supplemental enhancement information (SEI) message.

A case where a data table in which a relationship with another slice or group is described is defined for each slice or each group
- A table indicating a connection relationship between slices or groups is defined.
- A data table in which a list of slice numbers or group numbers of slices indicating spatial regions having an adjacent relationship is associated with each other is stored for a parent hierarchy, a child hierarchy, and the same hierarchy in each slice or each group.

As described above, the data table in the third embodiment indicates that the first space (for example, a space associated with the slice 100-3) and the second space (for example, a space associated with the slice 100-5) are adjacent to each other, for example, with respect to the X coordinate. That is, the data table in the third embodiment indicates the second slice (for example, slice 100-5) associated with the encoded data of the point cloud of the second space adjacent to the first space. The acquisition unit 40 acquires the second slice number (for example, "#5") indicating the second slice associated with the encoded data of the point cloud of the second space from the data table as the pointer.

The decoding unit 43 acquires the encoded data of the point cloud of the first space on the basis of the first slice number from the storage device 41. The decoding unit 43 decodes the point cloud data of the first space from the encoded data of the point cloud of the first space.

The decoding unit 43 acquires the encoded data of the point cloud of the second space adjacent to the first space on the basis of the second slice number from the storage device 41. The decoding unit 43 decodes the point cloud data of the second space from the encoded data of the point cloud of the second space adjacent to the first space.

As a result, it is possible to decode a part of the entire point cloud without decoding the entire point cloud distributed in a three-dimensional space.

(First Modification of Third Embodiment)

FIG. 9 is a diagram illustrating an example of a bounding box 200 in a first modification of the third embodiment.

A case where a data table in which a spatial region of a three-dimensional space associated with each slice or each group is described is defined
- A data table indicating a bounding box is defined for each slice number or each group number.

The decoding unit 43 decodes a data table indicating a bounding box. The decoding unit 43 determines, for each slice number or group number, whether a spatial region as a decoding target is in a slice on the basis of information regarding a bounding box. When the result is true (when the spatial region as a decoding target is included in the slice), the decoding unit 43 decodes the slice.
- Element (slice)
- Slice number or group number
- Element (data table)
- The number of slices or the number of groups.
- Slice number (for each slice) or group number (for each group).
- Information about bounding boxes (for each slice or group).
- A set of the origin of the bounding box and the size of the bounding box, a set of the origin of the bounding box and coordinates of a diagonal point of the bounding box, or the like.

(Second Modification of Third Embodiment)

Figure 10:
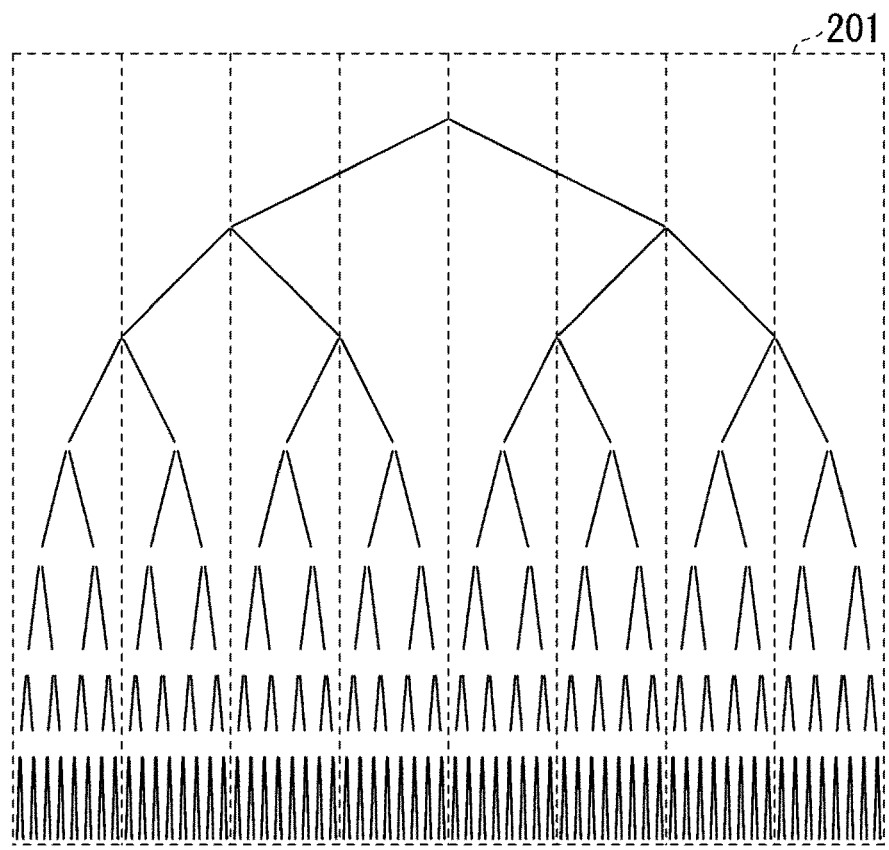
FIG. 10 is a diagram illustrating an example of a bounding box defined in encoded data in a second modification of the third embodiment.

FIG. 10 is a diagram illustrating an example of a bounding box 201 defined in encoded data in a second modification of the third embodiment.

In the prior art, tiles are utilized for decoding partial spaces. As described above, in the prior art, a slice tag added to a slice header is used for associating a tile and a slice. In the prior art, since one slice tag is defined for each slice, one slice can belong to only one tile. As described above, in the related art, since the spatial region is expressed using a plurality of trees and the tile is configured for each tree, the encoding efficiency is lower than the encoding efficiency in a case where the entire three-dimensional space is expressed using one tree.

In the prior art, when one octree structure is divided into tiles, two child slices with a common parent slice need to be assigned to different tiles. Also, since one slice cannot belong to multiple tiles, the parent slice also needs to be assigned to a tile different from the child slice. Therefore, in a case where the decoding of the child slice depends on the parent slice, the decoding unit 43 determines whether the slice is a dependent slice in order to decode one tile. The decoding unit 43 specifies a dependent slice on the basis of the determination result. The decoding unit 43 decodes the tile using the specified slice. As described above, in the related art, it is not possible to decode a partial space for each tile with respect to encoded data having one octree structure.

On the other hand, in the second modification of the third embodiment, the number of belonging tiles and the belonging tile number are added to the information to be added to the slice as the slice tag. As a result, one slice can belong to a plurality of tiles. For example, in the bounding box 201 illustrated in FIG. 10, each region surrounded by a dotted line is each tile. Each node of the octree structure illustrated in FIG. 10 belongs to all the tiles overlapping the spatial region to which its own node belongs. For example, the slice on the most root side belongs to all tiles. As a result, in the second modification of the third embodiment, the partial space can be decoded for each tile with respect to the encoded data having one octree structure.

In a case where tile function using tile inventory is extended and used
- Precondition: A tile is assigned a tile number (tile identifier). Each slice belongs to a tile with a tile number matching the slice number (slice tag) of its own slice (as a slice tag, a tile number is given). In the related art, only the tile number to which the slice belongs is held as the slice tag. That is, in the related art, "slice_tag" is defined in a slice header, and in a case where tile inventory is present, a tile number (tile identifier) is put in "slice_tag".

Tiles are defined for each smallest subgroup so that a single slice can have multiple slice tags.

The slice on the most root side belongs to all tiles.

The decoding unit 43 decodes the tile inventory. The decoding unit 43 specifies a tile number of a tile including a desired spatial region on the basis of a bounding box defined for each tile. The decoding unit 43 decodes a slice having a slice number (slice tag) matching this tile number.

Element (slice)

The number of tiles belonging to the data table.

Slice tags (for each tile).

Element (tile inventory)

Same as the tile inventory disclosed in Final Draft International Standard (FDIS) (see Reference Document 1).

Figure 11:
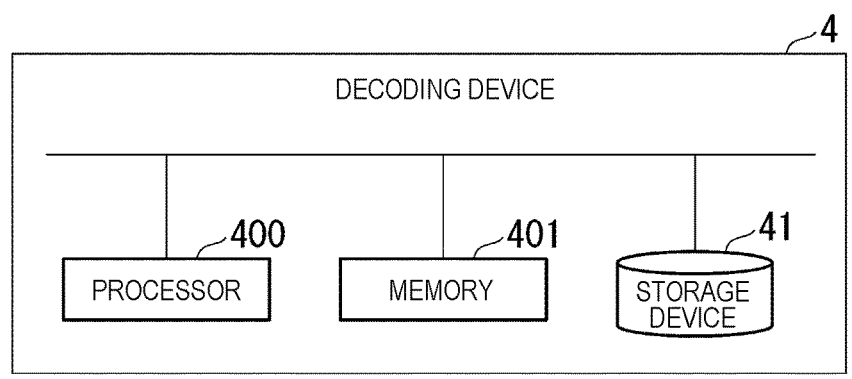
FIG. 11 is a diagram illustrating a hardware configuration example of a decoding device in each embodiment.

FIG. 11 is a diagram illustrating a hardware configuration example of the decoding device 4 in each embodiment. Some or all of the functional units of the decoding device 4 are implemented as software by a processor 400 such as a central processing unit (CPU) executing a program stored in a memory 401 including a nonvolatile recording medium (non-transitory recording medium). The program may be recorded on a computer-readable recording medium. The computer-readable recording medium is, for example, a portable medium such as a flexible disk, a magneto-optical disk, a read only memory (ROM), or a compact disc read only memory (CD-ROM), or a non-transitory recording medium such as a storage device 41 such as a hard disk included in a computer system. Some or all of the functional units of the decoding device 4 may be implemented by using hardware including an electronic circuit (electronic circuit or circuitry) using, for example, a large scale integrated circuit (LSI), an application specific integrated circuit (ASIC), a programmable logic device (PLD), a field programmable gate array (FPGA), or the like.

Although the embodiments of the present invention have been described in detail with reference to the drawings, specific configurations are not limited to the embodiments, and include design and the like within the scope of the present invention without departing from the gist of the present invention.

For example, the above embodiments may be combined.

For example, a pointer similar to the pointer indicating the slice associated with the encoded data of the geometry tree structure may be given to the slice footer of the slice associated with the encoded data of the attribute layer structure.

INDUSTRIAL APPLICABILITY

The present invention is applicable to a system that performs predetermined processing on point cloud data.

REFERENCE SIGNS LIST 1 point cloud data processing system
2 Encoding device
3 Communication line
4 Decoding device
Acquisition unit
41 Storage device
42 Control unit
43 Decoding unit
50 Geometric tree structure
51 Group
52 Group
53 Group
60 Node
61 Node
62 Node
63 Node
64 Node
65 Node
66 Node
67 Node
100 Slice
101 Slice header
102 Slice footer
200 Bounding box
201 Bounding box
400 Processor
401 Memory
530 Subgroup

The invention claimed is:

1. A decoding method performed by a decoding device, the decoding method comprising:

acquiring, from among a plurality of slice numbers indicating a plurality of slices associated with encoded data of the entire point cloud distributed in a three-dimensional space, a first slice number indicating a first slice associated with encoded data of a point cloud of a first space that is a portion of the three-dimensional space, based on a pointer indicating the first slice; and acquiring the encoded data of the point cloud of the first space based on the first slice number, and decoding point cloud data of the first space from the encoded data of the point cloud of the first space;

wherein the point cloud is expressed by an octree structure, the first space has a predetermined positional relationship to a second space, the second space is a portion of the three-dimensional space, the encoded data of the first slice and the encoded data of a second slice corresponding to the encoded data of the point cloud in the second space belong to a plurality of hierarchies defined for the encoded data of the entire point cloud, the predetermined positional relationship is a relationship of being spatially adjacent to each other or a relationship of a parent space and a child space, and a data table or tree indicating the relationship of the parent space and the child space is added to a slice header or a independent syntax table of the first slice.

2. The decoding method according to claim 1, wherein the first space has the predetermined positional relationship of being spatially adjacent to each other with respect to the second space that is a portion of spatially ac the three-dimensional space, the encoded data of the first slice and encoded data of a second slice associated with encoded data of a point cloud of the second space belong to the same hierarchy among a plurality of hierarchies defined in the encoded data of the entire point cloud, and the decoding device acquires a second slice number indicating the second slice associated with the encoded data of the point cloud of the second space based on a pointer indicating the second slice associated with the pieces of encoded data belonging to the same hierarchy, acquires the encoded data of the point cloud of the second space based on the second slice number, and decodes point cloud data of the second space from the encoded data of the point cloud of the second space.

3. The decoding method according to claim 1, wherein the first space has the predetermined positional relationship of being spatially adjacent to each other with respect to the second space that is a portion of the three-dimensional space, and the decoding device acquires, from overhead of the first slice indicated by the first slice number, the second slice number indicating a second slice associated with encoded data of a point cloud of the second space based on a pointer indicating the second slice associated with the encoded data belonging to a hierarchy lower than a hierarchy to which the encoded data of the first slice belongs, acquires the encoded data of the point cloud of the second space based on the second slice number, and decodes point cloud data of the second space from the encoded data of the point cloud of the second space.

4. The decoding method according to claim 1, wherein the first space has the predetermined positional relationship of being spatially adjacent to each other with respect to a second space that is a portion of the three-dimensional space, and the decoding device acquires, from overhead of the first slice indicated by the first slice number, a second slice number indicating the second slice associated with encoded data of a point cloud of the second space based on a pointer indicating the second slice associated with the encoded data of the point cloud of the second space adjacent to the first space, acquires the encoded data of the point cloud of the second space based on the second slice number, and decodes point cloud data of the second space from the encoded data of the point cloud of the second space.

5. The decoding method according to claim 1, wherein the first space has the predetermined positional relationship of being spatially adjacent each other with respect to a second space that is a portion of the three-dimensional space, and the decoding device acquires, from a data table representing association of each position in the three-dimensional space with the plurality of slice numbers, a second slice number indicating the second slice associated with encoded data of a point cloud of the second space based on a pointer indicating the second slice associated with the encoded data of the point cloud of the second space adjacent to the first space, acquires the encoded data of the point cloud of the second space based on the second slice number, and decodes point cloud data of the second space from the encoded data of the point cloud of the second space.

6. A decoding device comprising:

a processor; and a storage medium having computer program instructions stored thereon, when executed by the processor, perform to:

acquire, from among a plurality of slice numbers indicating a plurality of slices associated with encoded data of the entire point cloud distributed in a three-dimensional space, a first slice number indicating a first slice associated with encoded data of a point cloud of a first space that is a portion of the three-dimensional space, based on a pointer indicating the first slice; and acquire the encoded data of the point cloud of the first space based on the first slice number, and decodes point cloud data of the first space from the encoded data of the point cloud of the first space;

wherein the point cloud is expressed by an octree structure, the first space has a predetermined positional relationship to a second space, the second space is a portion of the three-dimensional space, the encoded data of the first slice and the encoded data of a second slice corresponding to the encoded data of the point cloud in the second space belong to a plurality of hierarchies defined for the encoded data of the entire point cloud, the predetermined positional relationship is a relationship of being spatially adjacent to each other or a relationship of a parent space and a child space, and a data table or tree indicating the relationship of the parent space and the child space is added a slice header or a independent syntax table of the first slice.

7. A non-transitory computer readable medium storing a program for causing a computer to function as a decoding device that performs the decoding method according to claim 1.

* * * * *